United States Patent
Spoto et al.

(10) Patent No.: US 8,241,479 B2
(45) Date of Patent: Aug. 14, 2012

(54) IMAGING OF DEEP STRUCTURES OF RELIEFS FOR SHALLOW RELIEF EMBOSSING

(75) Inventors: Louis M. Spoto, Hampton Falls, NH (US); Dean J. Randazzo, Chicago, IL (US); Matt Deschner, Downers Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 554 days.

(21) Appl. No.: 12/493,836

(22) Filed: Jun. 29, 2009

(65) Prior Publication Data

US 2010/0034993 A1 Feb. 11, 2010

Related U.S. Application Data

(60) Provisional application No. 61/079,701, filed on Jul. 10, 2008.

(51) Int. Cl.
*C25D 1/00* (2006.01)
(52) U.S. Cl. ............................................. 205/67; 205/70
(58) Field of Classification Search .................... 205/67, 205/70
See application file for complete search history.

(56) References Cited

U.S. PATENT DOCUMENTS

| 4,856,857 A | 8/1989 | Takeuchi et al. |
| 6,017,657 A | 1/2000 | Menz et al. |
| 2004/0072081 A1 * | 4/2004 | Coleman et al. ............... 430/5 |
| 2005/0067286 A1 * | 3/2005 | Ahn et al. ..................... 205/70 |
| 2006/0131683 A1 * | 6/2006 | Wake .......................... 257/432 |
| 2007/0042129 A1 | 2/2007 | Kang et al. |

FOREIGN PATENT DOCUMENTS

| WO | 2004084414 | 9/2004 |
| WO | 2006037851 | 4/2006 |

OTHER PUBLICATIONS

International Search Report for PCT/US09/50022 dated Jul. 9, 2009.

* cited by examiner

*Primary Examiner* — Luan Van
(74) *Attorney, Agent, or Firm* — Levenfeld Pearlstein, LLC

(57) ABSTRACT

A variety of deep structured decorative patterns originate with mechanical relief or etching. The present method incorporates a deeply patterned or textured etching or relief into a thin film embossing shim to simulate the look of the deep pattern or texture when used to emboss thin film or material. A transparent mold of the relief surface (such as brushed metal, engine-turned patterns, and textured glass) is formed using UV curable liquid and a transparent substrate. The relief copy in the transparent mold or overlay is mapped onto a photoresist surface or plate by shining or expanding one or more laser lights or laser beams through the transparent mold. The different heights of the relief copy of the transparent mold will cause the light to diffract/refract to form a corresponding patterned etching in the photoresist plate. The resulting photoresist plate is then metalized and electroplated to form a thin film embossing shim. The thin film embossing shim is then used with conventional embossing equipment to form thin film embossings. The embossed thin films can then be metalized and laminated onto substrate to create a product that has shifting patterns that reflect at a variety of viewing angles when (observed under normal lighting conditions) exposed to white light.

16 Claims, 3 Drawing Sheets

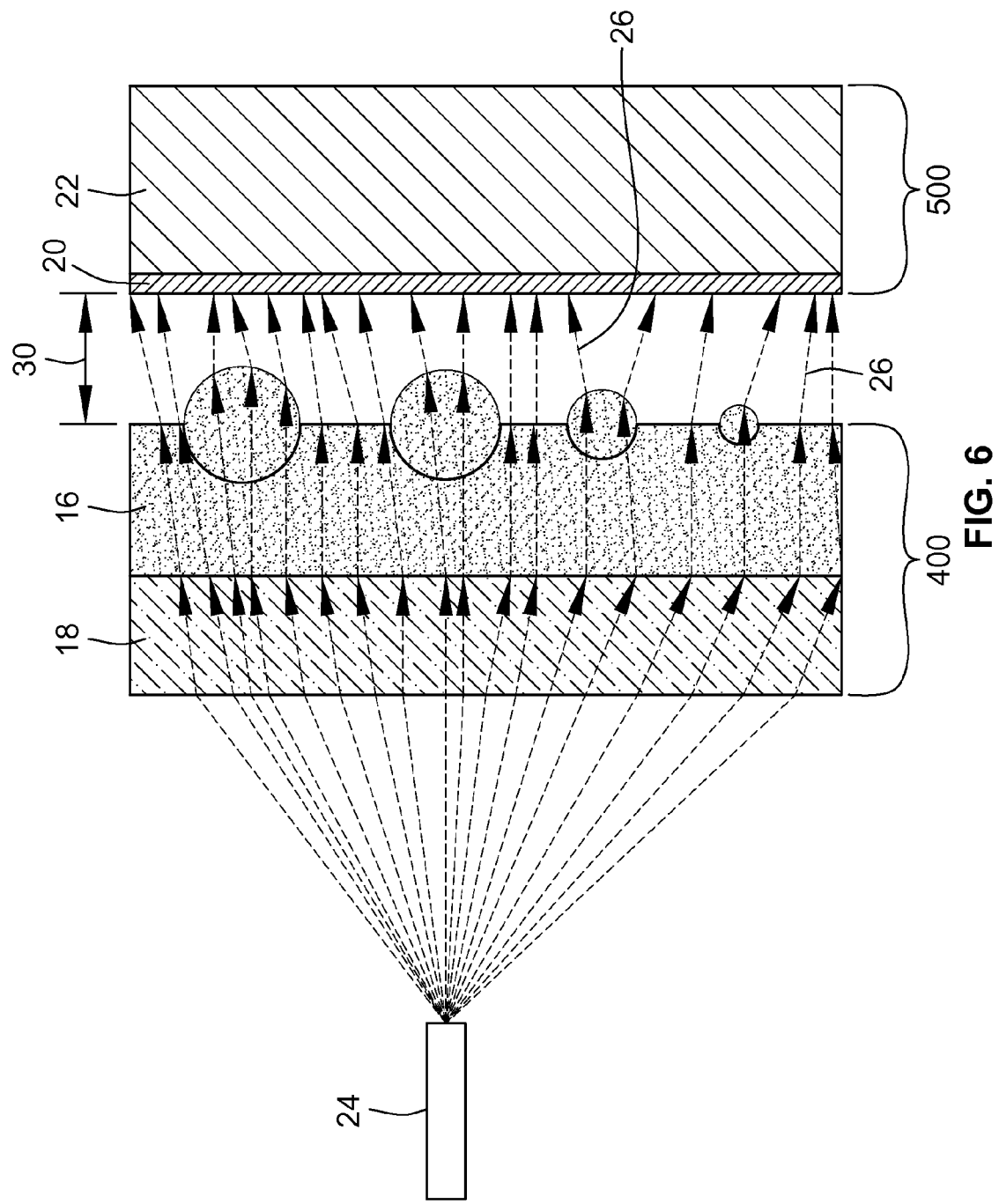

IMAGING OF DEEP STRUCTURES OF RELIEFS FOR SHALLOW RELIEF EMBOSSING

BACKGROUND OF THE INVENTION

The present invention is directed to a method for embossing materials. More particularly, the present invention pertains to a method for converting deep or textured patterns having a thickness of greater than 200 nanometers into shallow relief embossing shims for use with conventional holographic film embossing equipment.

Embossing is used to physically imprint images such as 3D microstructures or holographic images, onto material or film. Traditional embossing applies pressure to the backside of a material to alter the surface, giving the material a three dimensional or raised effect. In other words, traditional embossing transfers the 3D microstructure or hologram to the material. Typical film embossing machines use two cylindrical rollers, an embossing roller and a backing roller. An embossing stamper with a textured pattern, also known as an embossing shim, is attached to the embossing roller. Film, generally between 0.0006 and 0.001 inches thick or with greater, is pushed or pulled between the two rollers. The raised or textured embossing shim located on the embossing roller forces the film against the backing roller to create the embossed impression on the film. The embossed side of the impression may then be aluminized or metalized to turn the 3D microstructure into a reflection hologram. The film, with or without the metalization, can later be laminated to paper, cardboard, plastic, metals, or other substrates.

A textured pattern, also known as a relief, having a deep or thick profile greater than 400 nm usually cannot be embossed directly onto a substrate using traditional holographic embossing techniques, such as embossing rollers, because the quality of the product diminishes with increasing thickness of the 3D microstructure. Instead, if a deep relief, such as the grains of wood or brushed metal, for example, is desired, a brushed metal or other simulated relief is produced by physically brushing the film to simulate the texture or UV cast embossing to replicate the image onto the film. While effective, UV casting to accommodate texture patterns with a thickness or depth greater than 400 nm, or creating physical/actual texture can be cumbersome.

In some circumstances however, it is not necessary to have the actual total depth of the image embossed in the film. An image or impression which simulates the look of depth, without having the actual depth, can be sufficient to convey the design or texture desired.

Accordingly, there is a need for a way to simulate the look of deep or textured materials that have a thickness of greater than 400 nm on a material or film using conventional high speed embossing equipment. Such a method would utilize embossing shims having images which simulate the look of the thick or deep, three-dimensional reliefs. Desirably, such a method enables the embossing shim to be used on conventional high speed film embossing equipment. Furthermore, it is desirable that the embossing shim is easy to make and gives the same or similar effect of a three-dimensional image without having the bulk of a deep texture or pattern inhibit the use of conventional equipment.

BRIEF SUMMARY OF THE INVENTION

A relief is incorporated into a photodefineable surface by making a transparent mold of a relief surface, such as brushed metal, and then shining one or more lights through the mold such that the relief in the mold will map onto a photoresist surface. Mapping is created by different amounts of diffraction and refraction of the light, such as laser light/beams or other light sources producing a suitable spectrum of light, at locations corresponding to different heights of the mold. An embossing shim is made from the photoresist surface. Film is then embossed using the embossing shim, metalized, and laminated onto a substrate to create a product that either has shifting patterns at a variety of viewing angles when exposed to white light or mimics the look of the original relief.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 6 illustrates the diffraction of light through the transparent mold and onto a photoresist plate;

DETAILED DESCRIPTION OF THE INVENTION

Figure 1:
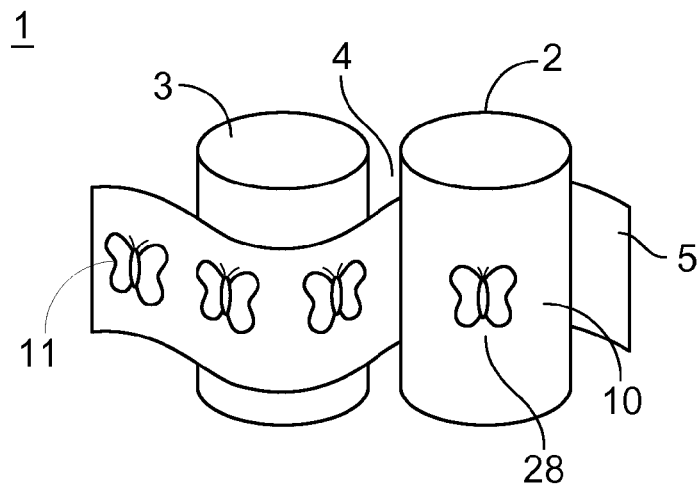
FIG. 1 illustrates an apparatus for making embossings on film using an embossing shim made in accordance with the principles of the present invention.
Figure 2:
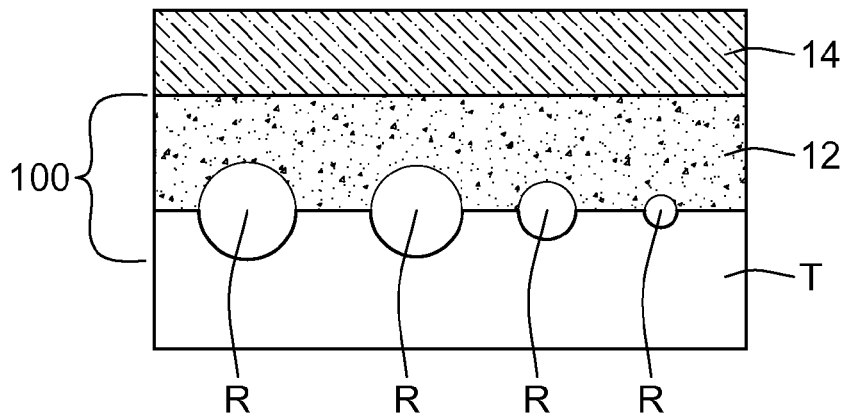
FIG. 2 illustrates a template of a relief being cast onto a vinyl sheet in a first step of a method of making an embossing shim for deep structures.
Figure 3:
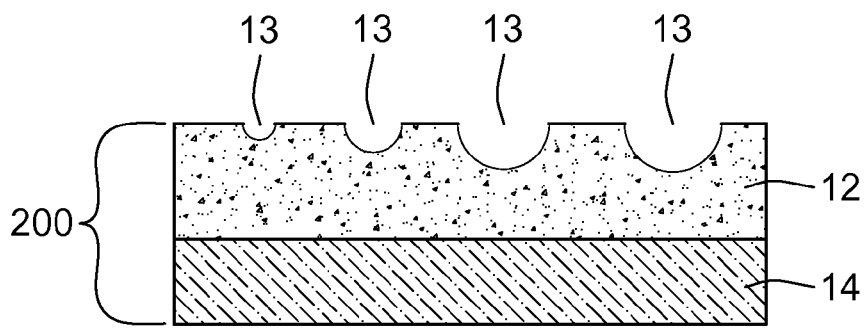
FIG. 3 illustrates a complimentary cast of the relief.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

A variety of deep structured decorative patterns originate with mechanical relief, such as polishing or grinding, or chemical processes such as etching. The present method incorporates a deeply patterned or textured etching or relief into a film embossing shim to simulate the look of the deep pattern or texture when used to emboss film or material. A transparent mold of the relief surface (such as brushed metal) is formed using UV curable liquid or silicon or other clear mold-making epoxies resins and a transparent substrate. The relief copy in the transparent mold or overlay is mapped onto a photoresist surface or plate by shining one or more light sources, such as a laser light/beam, through the transparent mold. The different heights of the relief copy of the transparent mold will cause the light to diffract/refract to form a corresponding patterned etching in the photoresist plate. The resulting photoresist plate is then metalized and electroplated to form a shallow relief embossing shim. The shallow relief embossing shim is then used with conventional high speed holographic embossing equipment to form the embossed image onto the film. The embossed film can then be metalized and laminated onto substrate to create a product that has shifting patterns that reflect at a variety of viewing angles when exposed to white light or has the appearance of the relief copied.

Referring now to FIG. 1, there is shown an apparatus 1 for making shallow relief embossings on film or paper. An embossing cylinder or roller 2 and a backing cylinder or roller 3 are positioned adjacent one another with a nip 4 formed between the two rollers 2, 3. A film 5 is pushed or pulled through the nip 5, between the rollers 2, 3. An embossing shim 10 is wrapped around the embossing roller 2. As the film 5 is pushed against the backing roller 3, and the embossing shim 10, an embossed image 11 is formed on the film 5. The embossed image 11 has a depth or thickness on the order of 200 nm or less.

FIGS. 2-7 illustrate a present method for making the shallow relief embossing shims. A three dimensional relief R, such as a brushed metal pattern ground into an aluminum or steel sheet, or other desirable deep pattern or decoration, is replicated using a UV casting process, onto a vinyl substrate 14. A template T having the relief R is coated with an ultraviolet (UV) curable liquid or casting resin 12. In a present embodiment, the UV curable liquid can cure in the absence of air, such as 801H anaerobic UV curable liquid available through Actega Radcure Corporation. Such a UV curable liquid absorbs wavelengths between, for example, in the 260-265 nm wavelengths and in the 300-310 nm wavelengths. Alternative UV curable liquids/casting resins can be used as well, such as those available through Capex Corporation Fort Lauderdale Florida or Locktite Corporation. Those skilled in the art will also appreciate that the present method need not be limited to UV curable liquids/casting resins and that silicon or a variety of different clear mold epoxy resins may be used and are within the scope of the present method. The UV casting resins listed are for explanation purposes only and do not limit the present method to those listed. It is understood that a variety of clear molding processes can be used and remain within the scope of the present invention.

A clear sheet of vinyl 14 is placed over the UV curable liquid 12 and template T. The layered structure 100 is subjected to UV curing to harden the UV curable liquid layer 12. The UV curable liquid layer 12 hardens forming a complimentary mask 13 of the relief R of template T. Again, those skilled in the art will appreciate that a corresponding curing methods for silicon or other epoxy resins may be suitable and in keeping with the scope of the present invention.

Figure 4:
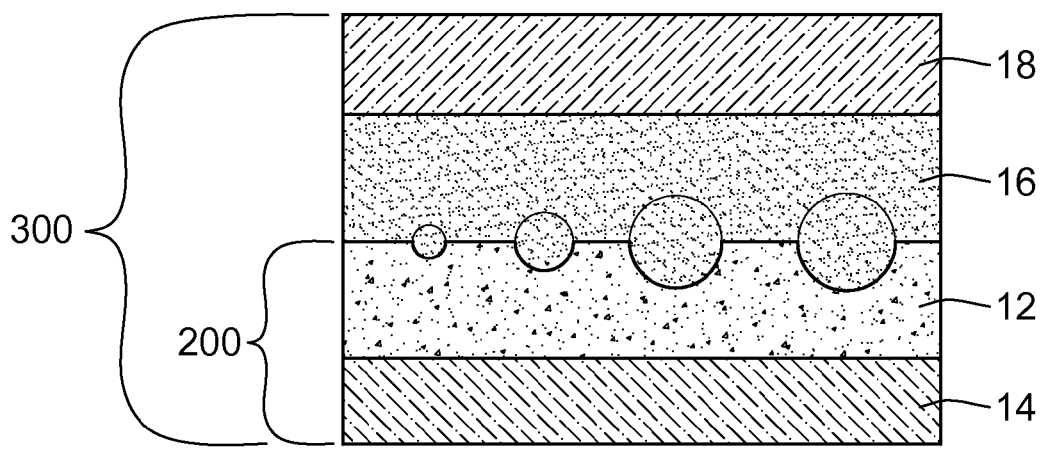
FIG. 4 illustrates the formation of the transparent mold.

Referring to FIG. 4, the UV-curable liquid/vinyl layered structure 200 is then cast onto a surface of glass 18 using the same technique. A second layer of UV curable liquid 16 is spread over the UV-curable liquid/vinyl layers 200 so that the UV curable liquid 16 fills the three dimensional complimentary relief of the complimentary mask 13 formed in the first, now hardened, UV curable liquid layer 12. Again, those skilled in the art will appreciate that the present method need not be limited to UV curable liquids/casting resins and that silicon or a variety of different clear mold epoxy resins may be used and are within the scope of the present method.

Over the second UV curable liquid layer 16 is placed a section of glass 18. In a present embodiment, the glass 18 is ¼ inch thick; however, it is contemplated that other transparent and/or light transmissive substances with corresponding thicknesses may be used in lieu of or in addition to the glass. In addition, while it is anticipated that the glass used is clear or transparent, it is contemplated that a colored glass may also be used depending on its light transmissive properties of the glass and wavelength of the laser light used. The layered structure 300 is subjected to UV curing to harden the second layer of UV-curable liquid 16.

Figure 5:
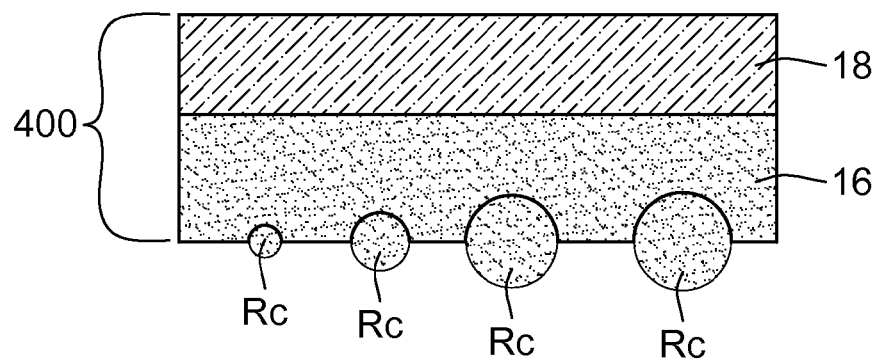
FIG. 5 illustrates the transparent mold.

As seen in FIG. 5, the glass 18, with the now hardened UV-curable layer 16 adhered thereto is peeled away from the vinyl/UV-curable layer 200 to form transparent mold 400. The hardened UV-curable layer 16 has a copy Rc, of the original relief R of template T. In other words, the relief R of template T has been copied and transferred to a transparent glass 18 such that light can be transmitted through the glass and through the relief Rc.

The glass 18 with the hardened UV-curable layer 16 (transparent mold 400) is then used to make a contact copy using a monochromatic wavelength of light, such as produced by laser light, mercury vapor, arc lights, or other light sources having blue wavelength such as sun light. In a present embodiment, laser light is used. The laser light diverges at a slight angle and travels through the transparent mold 400 and etches a photoresist surface 20 on a glass substrate 22. In FIG. 6, the transparent mold 400 is situated in a vertical position in front of a photoresist plate 500. The photoresist plate 500 is formed from a layer of photoresist 20, approximately 1.5 microns thick spread onto glass 22. Photoresist is a photosensitive emulsion, such as the Shipley 1800 series photoresist manufactured by Rohm Hass Electronic Materials of Marlborugh, Mass., or Photoresist AZ 1512 available from AZ Electronic Materials USA, Branchburg, N.J. and Shin Etsu Chemical, Toyko Japan. It is understood that the examples of photoresist given are for explanation purposes only and does not limit the types of photoresist that may be used with the present method. In one embodiment, the photoresist has a wavelength sensitivity of up to 457 nm.

The transparent mold 400 and the photoresist plate 500 rest in contact with one another. A gap 30 may be present separating the transparent mold 400 and the photoresist plate 500. A laser 24 is directed toward the glass 18 side of the transparent mold 400. The laser 24 and the slightly displaced laser light 26 refracts as it shines through the transparent mold 400 (and if present, gap 30) at varying angles, exposing the photoresist 20 to the laser light 26. Interference between the various refracted portions of light creates a complex diffraction pattern in the photoresist layer 20. The photoresist plate 500 with the exposed latent diffraction image is then developed. Areas of the photoresist 20 exposed to laser light 26, on exposure to a photoresist developer, will become soluble, while those areas unexposed to laser light 26 will remain insoluble. The gap 30 may be needed to protect the photoresist plate 500; however, a gap is not necessary for the proper utilization of the present method.

The developed photoresist plate 500 is silvered and then electroplated in nickel. The silvered and electroplated substrate is peeled away from the glass substrate 22. The photoresist material is destroyed in the electroplating process. The nickel silver copy that is peeled away from the glass ("silver master shim" or "grandmother") is replated. The side that had adhered to the glass, the silvered side, is electroplated in nickel. The newly nickeled surface is peeled away from the nickel/silver base to form the "metal master shim" or "mother". This electroplated product is the master shim 10. The silver master shim may be used to make multiple master shims 10 or the master shim 10 may be used to make more copies (referred to as "children").

Figure 7:
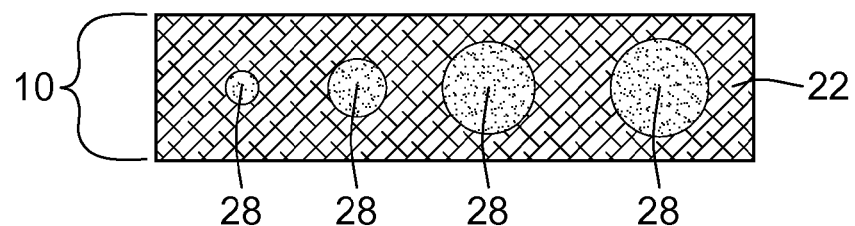
FIG. 7 illustrates an embossing shim having a 3D microstructure or holographic image made using the present method.

The resulting nickel-plated master embossing shim 10, of FIG. 7, has a flattened holographic image resembling the three dimensional relief R of template T. Additional shim copies are grown for use with traditional high speed holographic embossing equipment. The resulting embossing shim 10 contains an optical image of the deep relief of the template with similar kinetic playback characteristics yet without the physical depth of the original.

Advantages of the present embossing shim and method of making an embossing shim for deep reliefs will be apparent to those skilled in the art. The present invention transforms deep relief structures through the diffraction imaging technique disclosed to allow embossing, with conventional equipment, of holograms and deeply textured surfaces which mimic three-dimensional reliefs. The present method also produces pattern consistency of the end product through single master tooling. A variety of embodiments, including textured and etched glass, intaglio, and woven materials can be made using the present method.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of making an embossing shim for three-dimensional reliefs, the method comprising the steps of:
    preparing a transparent mold of having a first relief surface, wherein the first relief surface is transparent and configured to refract light;
    positioning a photoresist plate adjacent to the transparent mold with a gap between the photoresist plate and the transparent mold;
    shining a light through the transparent mold;
    mapping the first relief surface onto the photoresist plate, wherein the light refracts as it passes through the transparent mold including the first relief surface and creates a diffraction pattern on the photoresist plate;
    metallizing the photoresist plate; and
    electroforming the photoresist plate.

2. A method of making an embossing shim for three-dimensional reliefs, the method comprising the steps of:
    preparing a transparent mold having a first relief surface, wherein the transparent mold is prepared comprising the steps of:
        coating a second relief surface of a template with an ultraviolet (UV) curable liquid;
        layering a clear sheet of vinyl over the UV curable liquid; and
        curing the UV curable liquid to form a complimentary copy of the second relief surface;
    positioning a photoresist plate adjacent to the transparent mold;
    shining a light through the transparent mold;
    mapping the first relief surface onto the photoresist plate;
    metallizing the photoresist plate; and
    electroforming the photoresist plate.

3. The method of making an embossing shim for three-dimensional reliefs in accordance with claim 2, wherein the transparent mold is prepared further comprising the step of: peeling the second relief surface from the UV curable liquid to expose the complimentary relief surface formed within the UV curable liquid.

4. The method of making an embossing shim for three-dimensional reliefs, in accordance with claim 3, wherein the transparent mold is prepared further comprising the step of:
    casting the complimentary copy of the second relief surface onto a glass.

5. The method of making an embossing shim for three-dimensional reliefs in accordance with claim 3, wherein the transparent mold is prepared further comprising the step of:
    coating the complimentary relief surface with a second ultraviolet (UV) curable liquid;
    placing a glass onto the second UV curable liquid; and
    curing the second UV curable liquid to create a cast of the complimentary relief surface on the glass.

6. The method of making an embossing shim for three-dimensional reliefs in accordance with claim 5, wherein the transparent mold is disposed in a vertical orientation in front of the photoresist plate.

7. The method of making an embossing shim for three-dimensional reliefs in accordance with claim 2, wherein the photoresist plate is formed from a layer of photoresist disposed on a glass surface.

8. The method of making an embossing shim for three-dimensional reliefs in accordance with claim 5, wherein a light is directed toward the transparent mold.

9. The method of making an embossing shim for three-dimensional reliefs in accordance with claim 8, wherein the laser light refracts as it shines through the transparent mold and the gap at varying angles, exposing the photoresist plate to the light.

10. The method of making an embossing shim for three-dimensional reliefs in accordance with claim 9, wherein interference between various refracted portions of the light creates a complex diffraction pattern on the photoresist plate.

11. The method of making an embossing shim for three-dimensional reliefs in accordance with claim 10, wherein the photoresist plate with the exposed diffraction pattern, is developed.

12. The method of making an embossing shim for three-dimensional reliefs in accordance with claim 11, wherein areas of the photoresist plate exposed to the laser light become soluble, and areas unexposed to the light remain insoluble when developed.

13. The method of making an embossing shim for three-dimensional reliefs in accordance with claim 11, including the step of silvering the developed photoresist plate.

14. The method of making an embossing shim for three-dimensional reliefs in accordance with claim 13, including the step of electroplating the developed photoresist plate in nickel.

15. The method of making an embossing shim for three-dimensional reliefs in accordance with claim 14, including the step of removing an electroplated photoresist copy from the photoresist plate and electroplating in nickel a silvered side of the photoresist copy.

16. The method of making an embossing shim for three-dimensional reliefs in accordance with claim 2, wherein the light is at least one of laser light, sunlight, arc light, and monochromatic light.

* * * * *